US012734666B2

(12) United States Patent
Yang

(10) Patent No.: US 12,734,666 B2
(45) Date of Patent: Sep. 15, 2026

(54) POWER TOOL FACILITATING REPLACEMENT OF OPERATING HEAD

(71) Applicant: ZHEJIANG PRULDE ELECTRIC APPLIANCE CO., LTD., Jinhua (CN)

(72) Inventor: Chenghao Yang, Jinhua (CN)

(73) Assignee: ZHEJIANG PRULDE ELECTRIC APPLIANCE CO., LTD., Jinhua (CN)

( * ) Notice: Subject to any disclaimer, the term of this patent is extended or adjusted under 35 U.S.C. 154(b) by 33 days.

(21) Appl. No.: 18/927,124

(22) Filed: Oct. 25, 2024

(65) Prior Publication Data

US 2025/0236006 A1 Jul. 24, 2025

(30) Foreign Application Priority Data

Jan. 24, 2024 (CN) ......................... 202420171941.0

(51) Int. Cl.

*B25F 5/02* (2006.01)
*B24B 23/02* (2006.01)
*B25F 5/00* (2006.01)

(52) U.S. Cl.

CPC .............. *B25F 5/02* (2013.01); *B24B 23/022* (2013.01); *B25F 5/001* (2013.01)

(58) Field of Classification Search

CPC ...... B25F 5/02; B25F 5/001; Y10T 483/1733; B24B 23/022; B27C 9/005; B27C 9/02; B23B 31/06; B23B 45/008; B25B 15/008; B25B 23/0035; B25B 21/002; F02N 15/022; F02N 15/02; F02N 15/027; F02N 11/14; F02N 11/12; F02N 11/087; F16D 1/10

See application file for complete search history.

(56) References Cited

U.S. PATENT DOCUMENTS 3,208,307 A * 9/1965 Bengt ...................... F16H 13/08 475/904
3,699,825 A * 10/1972 Misuraca ................ B25F 5/001 310/47

(Continued)

FOREIGN PATENT DOCUMENTS

CN 101189094 B * 5/2011 ......... B23B 31/1253
CN 103967984 A * 8/2014 ........... B23B 31/123

(Continued)

*Primary Examiner* — Robert F Long
*Assistant Examiner* — Eduardo R Ferrero
(74) *Attorney, Agent, or Firm* — Oliff PLC

(57) ABSTRACT

The power tool facilitating replacement of an operating head includes a housing and a drive motor disposed in the housing, the drive motor being in transmission connection with an output shaft, the output shaft being mounted with a shaft-locking mechanism, the shaft-locking mechanism including a first clutch piece, a second clutch piece, and a control pusher, the control pusher being in transmission connection with the second clutch piece to control the second clutch piece to move along the axial direction of the output shaft, a control switch being provided in the housing, the control pusher having a power-on position, a power-off position, and a shaft-locking position which are sequentially arranged along the axial direction of the output shaft. The disclosure mainly allows for snap-fitting between the first clutch piece and the second clutch piece after the output shaft completely stops rotation.

10 Claims, 6 Drawing Sheets

(56) References Cited

U.S. PATENT DOCUMENTS

| | | | | |
|---|---|---|---|---|
| 3,872,951 | A * | 3/1975 | Hastings, Jr. | B24B 23/022<br>408/124 |
| 3,899,852 | A * | 8/1975 | Batson | B24B 23/022<br>74/411.5 |
| 4,179,632 | A * | 12/1979 | Harvell | H02K 7/145<br>403/324 |
| 4,317,578 | A * | 3/1982 | Welch | B23B 31/1207<br>279/62 |
| 4,324,512 | A * | 4/1982 | Siroky | B25B 33/005<br>408/241 R |
| 4,434,586 | A * | 3/1984 | Muller | B24B 45/006<br>451/342 |
| 4,860,429 | A * | 8/1989 | von Haas | B23Q 3/15553<br>483/46 |
| 5,357,179 | A * | 10/1994 | Abbagnaro | H05K 3/0044<br>318/17 |
| 5,496,139 | A * | 3/1996 | Ghode | B25F 5/001<br>279/158 |
| 5,511,912 | A * | 4/1996 | Ellerbrock | B23D 51/16<br>74/56 |
| 5,765,652 | A * | 6/1998 | Mathis | B25F 5/001<br>173/217 |
| 6,155,576 | A * | 12/2000 | Yorde | B23B 31/202<br>279/54 |
| 6,311,787 | B1 * | 11/2001 | Berry | B25F 5/001<br>192/223.2 |
| 6,488,451 | B1 * | 12/2002 | Hartman | B25F 5/001<br>408/124 |
| 7,108,464 | B2 * | 9/2006 | Cooper | B25F 5/02<br>409/181 |
| 7,806,199 | B2 * | 10/2010 | Pohl | B25D 16/006<br>173/171 |
| 7,988,538 | B2 * | 8/2011 | Trautner | H02K 9/06<br>451/344 |
| 8,235,139 | B2 * | 8/2012 | Chen | B27B 5/38<br>408/239 R |
| 8,540,580 | B2 * | 9/2013 | Santamarina | B25B 23/12<br>81/475 |
| 11,919,117 | B2 * | 3/2024 | Mueckl | B23Q 5/043 |
| 2002/0130007 | A1 * | 9/2002 | Nakamura | B25B 21/00<br>173/217 |
| 2003/0190877 | A1 * | 10/2003 | Gallagher | B24B 55/00<br>451/344 |
| 2006/0233621 | A1 * | 10/2006 | Schell | B23B 45/008<br>408/139 |
| 2006/0276114 | A1 * | 12/2006 | Gallagher | B24B 55/102<br>451/344 |
| 2010/0078187 | A1 * | 4/2010 | Chen | F16D 63/006<br>173/171 |
| 2010/0252292 | A1 * | 10/2010 | Pyles | B23Q 5/20<br>408/124 |
| 2012/0139196 | A1 * | 6/2012 | Zhou | B24B 23/022<br>279/140 |
| 2013/0082449 | A1 * | 4/2013 | Bernardi | B24B 23/022<br>279/141 |
| 2013/0284471 | A1 * | 10/2013 | Eshleman | B25B 21/00<br>173/1 |
| 2018/0335118 | A1 * | 11/2018 | Gu | B25F 5/001 |
| 2019/0293041 | A1 * | 9/2019 | Dong | B25F 5/001 |
| 2020/0171613 | A1 * | 6/2020 | Arthur | B25B 21/00 |
| 2022/0143801 | A1 * | 5/2022 | Jampolski | B25F 5/001 |
| 2023/0302620 | A1 * | 9/2023 | Dubnicka | B25F 5/001 |

FOREIGN PATENT DOCUMENTS

| | | | | | |
|---|---|---|---|---|---|
| CN | 111469221 | A | * | 7/2020 | B27C 5/10 |
| CN | 215470918 | U | | 1/2022 | |
| CN | 114986453 | A | * | 9/2022 | B25F 5/029 |
| DE | 3741484 | C1 | * | 8/1989 | B24B 45/006 |
| DE | 60131220 | T2 | * | 8/2008 | B24B 23/022 |
| DE | 202014101301 | U1 | * | 7/2014 | B25B 21/00 |
| EP | 0612588 | A1 | * | 8/1994 | B25F 5/001 |
| EP | 2740571 | A1 | * | 6/2014 | B25F 5/029 |
| GB | 2327054 | A | * | 1/1999 | B25F 5/001 |
| WO | WO-2012040891 | A1 | * | 4/2012 | B25F 5/001 |
| WO | WO-2023237125 | A1 | * | 12/2023 | B25F 5/02 |

* cited by examiner

POWER TOOL FACILITATING REPLACEMENT OF OPERATING HEAD

FIELD

The disclosure relates to power tools, and more particularly relates to a power tool facilitating replacement of an operating head.

BACKGROUND

For power tools with a terminal outputting through a rotary driving force, for example electric grinders, circular saws, angle grinders, electric routers, milling-and-drilling machines, and spiral saws which perform grinding, cutting, drilling-and-milling, polishing and further processing to an object such as wood, metal, and stone, a vast majority of them require a separate, specific operating head (e.g., a cutting head, a grinding head, a drill bit) attached thereto for effective processing of a workpiece. The operating head is generally securely attached to an output shaft via a clamping head or a nut; when disassembling and replacing the operating head, a shaft locking mechanism is needed to limit the output shaft from rotating.

For example, the power tool disclosed in CN215470918U comprises a housing and a shaft locking mechanism, the shaft locking mechanism comprising a first clutch, a second clutch, and a push plate, the first clutch being secured to an output shaft, the push plate being configured to push the second clutch so as to drive the second clutch to move along an axial direction of the output shaft; each of the first clutch and the second clutch is provided with a recess and a tab, snap-fitting between the recess and the tab enabling fitting between the first clutch and the second clutch for circumferential limit, thereby limiting the output shaft from rotating, which facilitates replacement of an operating head; in addition, a microswitch is further provided in the housing; while the push plate is pushed to drive the second clutch away from the first clutch to thereby release the locked output shaft, the push plate also triggers the microswitch to activate the power tool.

For another example, the electric grinder facilitating replacement of a grinding head disclosed in CN209078476U comprises a housing, a drive motor, and a push rod, on an output shaft of the drive motor being provided a clutch piece rotating synchronously with the output shaft and a clutch sleeve slidingly movable in a front-aft direction along the output shaft; when the push rod moves forward, the clutch sleeve is pushed to move forward to thereby disengage from the clutch piece while activating the drive motor; when the push rod moves rearward, the clutch sleeve is pushed to move rearward to engage with the clutch piece while being released from activation of the drive motor, whereby replacement of the operating head is facilitated.

In the conventional technologies noted supra, the push plate only has two positions: a power-on position and a shaft-locking position; when the push plate travels from the power-on position to the shaft-locking position, the output shaft would still rotate due to inertia although the drive motor has been deactivated, so that a chattering phenomenon would arise when the shaft-locking mechanism is snap-fitted, further causing impact on the shaft locking mechanism, which is prone to cause damages to the shaft-locking mechanism, significantly reducing service life of the shaft-locking mechanism; meanwhile, a loud noise would also arise during the snap-fitting process, causing discomfort to a user and damping user experience.

SUMMARY

To overcome a chattering problem easily occurring when a shaft locking mechanism is snap-fitted, a power tool facilitating replacement of an operating head is provided herein, which allows for snap-fitting between a first clutch piece and a second clutch piece after an output shaft completely stops rotation.

The disclosure adopts a technical solution below:

a power tool facilitating replacement of an operating head, comprising a housing and a drive motor disposed in the housing, the drive motor being in transmission connection with an output shaft configured to mount the operating head, the output shaft being mounted with a shaft-locking mechanism, the shaft-locking mechanism comprising a first clutch piece secured to the output shaft, a second clutch piece sleeved over the output shaft, and a control pusher moving along an axial direction of the output shaft, wherein the control pusher is in transmission connection with the second clutch piece to control the second clutch piece to move along the axial direction of the output shaft, a control switch configured to control activation and deactivation of the drive motor is provided in the housing, the control pusher has a power-on position where the control switch is triggered and the second clutch piece is separated from the first clutch piece, a power-off position where the control switch is released and the second clutch piece is separated from the first clutch piece, and a shaft-locking position where the control switch is released and the second clutch piece and the first clutch piece form a circumferential limit, the power-on position, the power-off position, and the shaft-locking position being sequentially arranged along the axial direction of the output shaft, and a locating mechanism configured to locate the control pusher is disposed between the control pusher and the housing.

The disclosure offers the following benefits:

In the disclosure, the control pusher has a power-on position, a power-off position, and a shaft-locking position, the power-on position, the power-off position, and the shaft-locking position being arranged sequentially along the axial direction of the output shaft. When the control pusher is located at the power-on position, the control pusher triggers the control switch to activate the drive motor, and meanwhile the control pusher drives the second clutch piece away from the first clutch piece, so that the first clutch piece can rotate synchronously with the output shaft; when the control pusher travels from the power-on position to the power-off position, the control pusher releases the control switch to deactivate the drive motor, while the output shaft is still rotating due to inertia; however, since the second clutch piece is currently not snap-fitted with the first clutch piece yet, the second clutch piece can be prevented from being directly snap-fitted with the rotating first clutch piece, thereby providing sufficient time for the output shaft to stop rotation; after the output shaft stops rotating, the control pusher travels from the power-off position to the shaft-locking position, whereby the control pusher drives the second clutch piece to be snap-fitted with the first clutch piece to form a circumferential limit against rotation of the output shaft, resulting in locking of the output shaft, which facilitates replacement of the operating head.

In the disclosure, during transition of the output shaft from the operating state to the locked state, the control pusher sequentially traverses the power-on position, the power-off position, and the shaft-locking position; the locating mechanism can retain the control pusherto the power-off position so as to provide sufficient time for the output shaft to stop rotation, which may effectively prevent the second clutch piece from snap-fitting with the rotating first clutch piece, lowering a possibility of occurrence of chattering and impact to the first clutch piece and the second clutch piece, resulting in smoother and gentler fitting between the first clutch piece and the second clutch piece, thereby improving reliability and service life of the shaft-locking mechanism, which contributes higher cost-effectiveness to the power tool; in addition, this arrangement can also reduce the noise arising from fitting between the first clutch piece and the second clutch piece, thereby improving user experience; moreover, arrangement of the shaft-locking mechanism along the axial direction of the output shaft facilitates reduction of the diameter of the power tool, so that the power tool is made more compact in the overall size, which facilitates users to carry and use, thereby improving use experience; meanwhile, it may also improve utilization of the internal space of the housing, so that the overall structure of the power tool is made further compact.

In some implementations, a plurality of recesses are arranged at intervals on a surface of one of the first clutch piece and the second clutch piece, and a convex tooth is arranged on a surface of the other one of the first clutch piece and the second clutch piece; when the control pusher is located at the shaft-locking position, the context tooth is inserted into a corresponding recess so that the circumferential limit is formed between the first clutch piece and the second clutch piece. With this technical solution, insertion of the convex tooth into the recess can improve fitting stability between the first clutch piece and the second clutch piece and reduce a possibility of slip causing relative movement between the first clutch piece and the second clutch piece, so that the output shaft is locked more securely and reliably, facilitating replacement of the operating head.

In some implementations, a plurality of protrusions are arranged at intervals on an outer peripheral side surface of the first clutch piece, a recess is formed between every neighboring two protrusions, and the convex tooth is arranged at a side of the second clutch piece proximal to the first clutch piece and extends towards the first clutch piece.

In some implementations, a first guide surface is formed at an end portion of each of the protrusions proximal to the second clutch piece; and/or, a second guide surface is formed at an end portion of the convex tooth proximal to the first clutch piece. With this technical solution, the first guide surface and/or the second guide surface can both guide insertion of the convex tooth into the recess, resulting in smoother fitting between the convex tooth and the recess and reducing a possibility of the convex tooth abutting against the end portion of the protrusion, whereby the convex tooth can be stably inserted into the recess.

In some implementations, the locating mechanism comprises three locating slots formed in the housing and a locating block arranged on the control pusher, the three locating slots corresponding to the power-on position, the power-off position, and the shaft-locking position, respectively; when the control pusher is located at the power-on position, or the power-off position, or the shaft-locking position, the locating block is inserted into the corresponding locating slot. With this technical solution, fitting between the locating slot and the locating block enables the control pusher to be firmly retained to the power-on position, or the power-off position, or the shaft-locking position, eliminating a need for the user to press the control pusher all along during the operation, thereby facilitating the user's operation and enhance user experience; in addition, both hands are available to replace the operating head due to elimination of the need of pressing the control pusher all along, which facilitates replacement of the operating head and thus improves replacement efficiency; moreover, by inserting the locating block in the locating slot, the user can clearly detect that the control pusher has moved in place, which may improve locating accuracy of the control pusher, so that the user can be assured in operating the power tool, further enhancing user experience.

In some implementations, the locating block is an elastomer; two ends of the locating block protrude beyond two lateral sides of the control pusher; and a smooth curved surface is formed at each of the two ends of the locating block. This technical solution allows for reduction of the external force needed to release the locating block from the locating slot, further reducing the external force needed for the user to push the control pusher, thereby easing the user's operation; in addition, this can also lower the possibility of the locating block being stuck in the locating slot, rendering smoother sliding of the control pusher.

In some implementations, a tab is arranged at an outer peripheral side of the second clutch piece, and the control pusher is formed with a snap slot; the control pusher and the second clutch piece are connected via snap-fitting between the tab and the snap slot. This technical solution can improve coupling stability between the control pusher and the second clutch piece and reduce a possibility of the second clutch piece disengaging from the control pusher, so that the second clutch piece can move synchronously with the control pusher.

In some implementations, the control pusher is provided with two extension plates extending till two lateral sides of the second clutch piece, the snap slot being formed on each of the extension plates, a front end of each of the extension plates having an abutting surface; when the control pusher is located at the power-on position, the abutting surface abuts against a contact piece of the control switch to trigger the control switch. With this technical solution, the second clutch piece is connected to the control pusher via the tabs at two lateral sides, so that the second clutch piece is located in place more stably, reducing a possibility of circumferential rotation of the second clutch piece.

In some implementations, the housing is provided with a guide rail configured to guide the control pusher to slide; and the control pusher comprises a push plate and a sliding groove, the push plate being exposed out of an outer surface of the housing, the guide rail being in sliding connection with the sliding groove. With this technical solution, by arranging the push plate to be exposed out of the outer surface of the housing, the user can impose a force against the control pusher more conveniently, and fitting between the guide rail and the sliding groove enables the control pusher to slide more smoothly.

In some implementations, an end portion of the output shaft is attached with a locking nut and a clamping core that is configured to mount the operating head; an outer surface of the end portion of the output shaft being formed with a thread; the locking nut is in threaded connection with the output shaft; a clamping force of the clamping core with respect to the operating head is adjusted via fitting between the locking nut and the output shaft.

Other features and advantages of the disclosure will be described in detail through specific implementations with reference to the accompanying drawings.

BRIEF DESCRIPTION OF THE DRAWINGS

Hereinafter, the disclosure will be further described with reference to the accompanying drawings below.

REFERENCE NUMERALS

Figure 1:
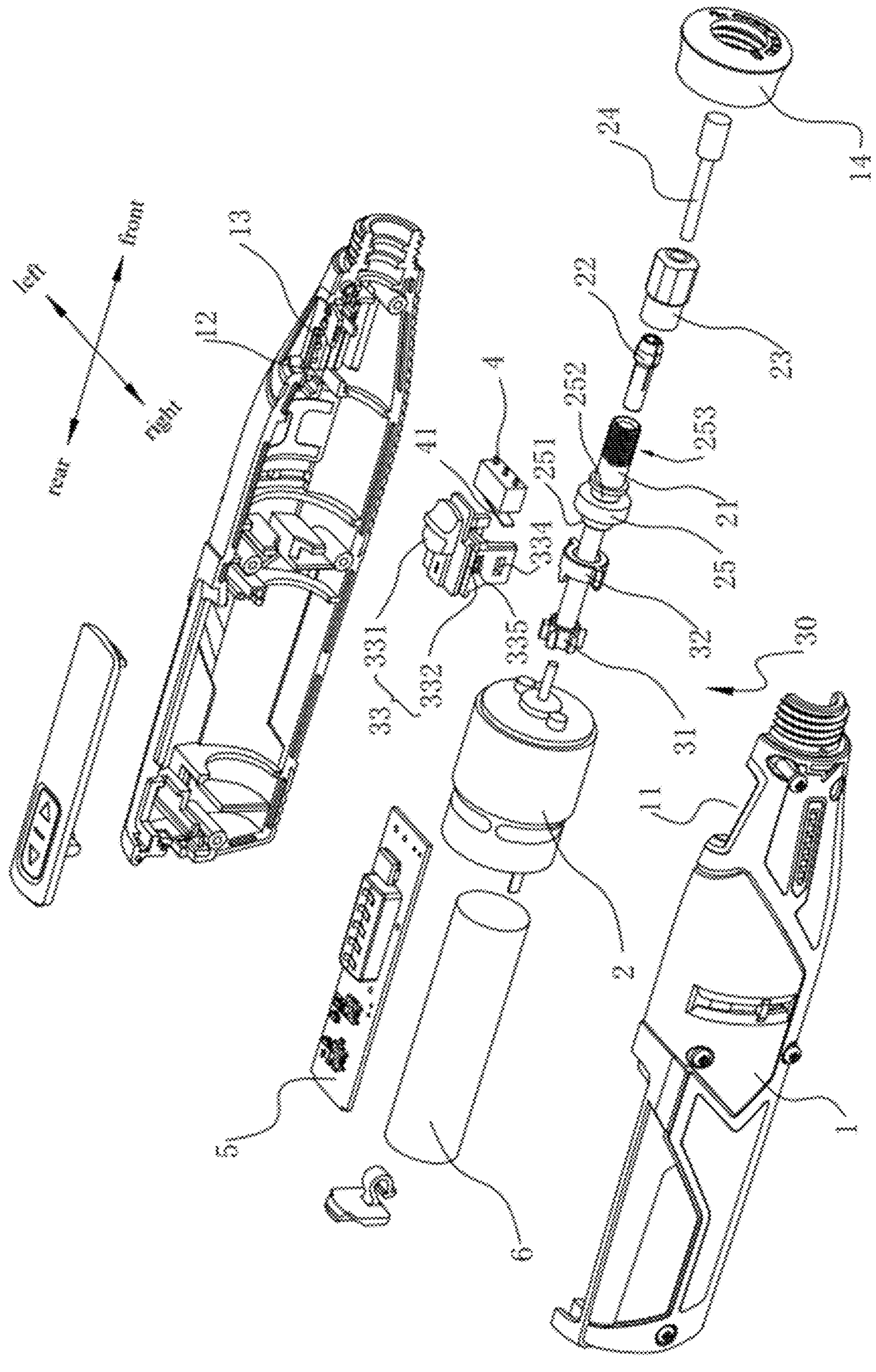
FIG. 1 is an exploded view of a power tool according to implementations of the disclosure.
Figure 2:
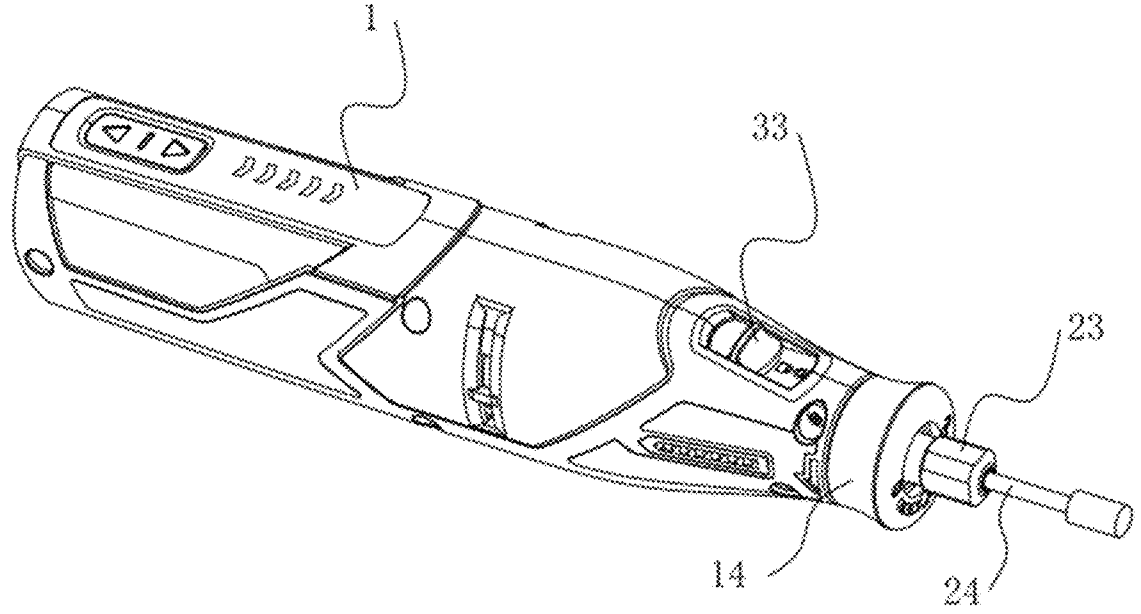
FIG. 2 is a structural schematic diagram of a power tool according to implementations of the disclosure.

- 1—housing; 11—mounting groove; 12—guide rail; 13—locating slot; 14—cap;
- 2—drive motor; 21—output shaft; 22—clamping core; 23—locking nut; 24—operating head; 25—bearing; 251—check ring; 252—shaft shoulder; 253—thread;
- 30—shaft locking mechanism;
- 31—first clutch piece; 311—protrusion; 312—recess; 313—first guide surface;
- 32—second clutch piece; 321—convex tooth; 322—tab; 323—second guide surface;
- 33—control pusher; 331—push plate; 332—sliding groove; 333—extension plate; 334—snap slot; 335—locating block; 336—mounting base;
- 34—locating mechanism;
- 4—control switch; 41—contact piece;
- 5—control circuit board;
- 6—power source

DETAILED DESCRIPTION OF EMBODIMENTS

Hereinafter, the technical solutions of the implementations of the disclosure will be explained and illustrated with reference to the accompanying drawings. In the description of the disclosure, it needs to be noted that the orientational or positional relationships indicated by the terms "center," "longitudinal," "transverse," "length," "width," "thickness", "upper," "lower," "front," "rear," "left," "right," "vertical," "horizontal," "top," "bottom," "inner," "clockwise," "counterclockwise," and etc. are orientational and positional relationships based on the drawings, which are intended only for easing description of the disclosure and simplifying relevant illustrations, not for indicating or implying that the devices or elements compulsorily possess those specific orientations and are compulsorily configured and operated with those specific orientations; therefore, such terms should not be construed as limitations to the disclosure.

As illustrated in FIGS. 1 to 10, the implementation provides a power tool facilitating replacement of an operating head, comprising a housing 1 and a drive motor 2 disposed in the housing 1, the housing 1 being formed of two pieces spliced together, a front end of the housing 1 being in threaded connection with a cap 14, an output end of the drive motor 2 being in transmission connection with an output shaft 21, a bearing 25 being disposed on the output shaft 21, two lateral sides of the bearing 25 being retained via a shaft shoulder 252 and a check ring 251, respectively, a front end of the output shaft 21 being attached with a locking nut 23 and a clamping core 22 which is configured to mount an operating head 24, an outer surface of an end portion of the output shaft 21 being formed with a thread 253, the locking nut 23 being in threaded connection with the output shaft 21, the locking nut 23 being fitted with the output shaft 21 to adjust a clamping force of the clamping core 22 with respect to the operating head 24; to replace the operating head 24, the locking nut 23 is turned relative to the output shaft 21 so as to relieve the clamping force of the locking nut 23 with respect to the clamping core 22, thereby facilitating replacement of the operating head 24.

In this implementation, a shaft locking mechanism 30 is mounted on the output shaft 21, the shaft locking mechanism 30 comprising a first clutch piece 31 secured on the output shaft 21, a second clutch piece 32 sleeved over the output shaft 21, and a control pusher 33 moving along an axial direction of the output shaft 21, the control pusher 33 being in transmission connection with the second clutch piece 32 and operable to control the second clutch piece 32 to move along the axial direction the output shaft 21; a control switch 4 operable to activate and deactivate the drive motor 2 is disposed in the housing 1; the control pusher 33 has a power-on position where the control switch 4 is triggered and the second clutch piece 32 is separated from the first clutch piece 31, a power-off position where the control switch 4 is released and the second clutch piece 32 is separated from the first clutch piece 31, and a shaft-locking position where the control switch 4 is released and the second clutch piece 32 and the first clutch piece 31 form a circumferential limit, the power-on position, the power-off position, and the shaft-locking position being arranged sequentially along the axial direction of the output shaft 21, a locating mechanism 34 being arranged between the control pusher 33 and the housing 1 to locate the control pusher 33 sequentially at the power-on position, at the power-off position, and at the shaft-locking position. Specifically, the power-on position, the power-off position, and the shaft-locking position may be arranged sequentially from front to rear or arranged sequentially from rear to front.

In this implementation, when the control pusher 33 is located at the power-on position, the control pusher 33 triggers the control switch 4 to activate the drive motor 2, and meanwhile the control pusher 33 drives the second clutch piece 32 away from the first clutch piece 31, so that the first clutch piece 31 can rotate synchronously with the output shaft 21; when the control pusher 33 travels from the power-on position to the power-off position, the control pusher 33 releases the control switch 4 to deactivate the drive motor 2, while the output shaft 21 is still rotating due to inertia; however, since the second clutch piece 32 is currently not snap-fitted with the first clutch piece 31 yet, the second clutch piece 32 can be prevented from being directly snap-fitted with the rotating first clutch piece 31, thereby providing sufficient time for the output shaft 21 to stop rotation; after the output shaft 21 stops rotating, the control pusher 33 travels from the power-off position to the shaft-locking position, whereby the control pusher 33 drives the second clutch piece 32 to be snap-fitted with the first clutch piece 31 to form a circumferential limit against rotation of the output shaft 21, resulting in locking of the output shaft 21, which facilitates replacement of the operating head 24.

In this implementation, during transition of the output shaft 21 from the operating state to the locked state, the control pusher 33 sequentially traverses the power-on position, the power-off position, and the shaft-locking position; the locating mechanism 34 can retain the control pusher 33 to the power-off position so as to provide sufficient time for the output shaft 21 to stop rotation, which may effectively prevent the second clutch piece 32 from snap-fitting with the rotating first clutch piece 31, lowering a possibility of occurrence of chattering and impact to the first clutch piece 31 and the second clutch piece 32, resulting in smoother and gentler fitting between the first clutch piece 31 and the second clutch piece 32, thereby improving reliability and service life of the shaft-locking mechanism 30, which contributes higher cost-effectiveness to the power tool; in addition, this arrangement can also reduce the noise arising from fitting between the first clutch piece 31 and the second clutch piece 32, thereby improving user experience; moreover, arrangement of the shaft-locking mechanism 30 along the axial direction of the output shaft 21 facilitates reduction of the diameter of the power tool, so that the power tool is made more compact in the overall size, which facilitates users to carry and use, thereby improving use experience; meanwhile, it may also improve utilization of the internal space of the housing 1, so that the overall structure of the power tool is made further compact.

Figure 6:
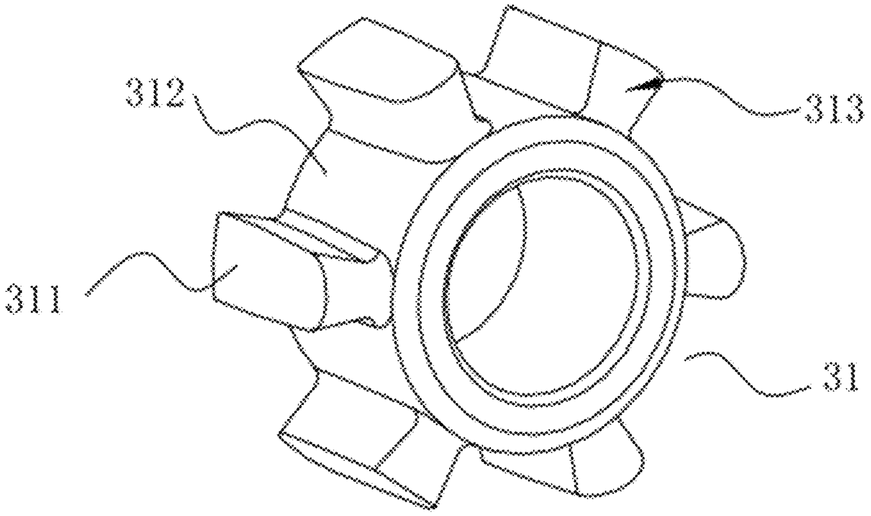
FIG. 6 is a structural schematic diagram of a first clutch piece in a power tool according to implementations of the disclosure.
Figure 7:
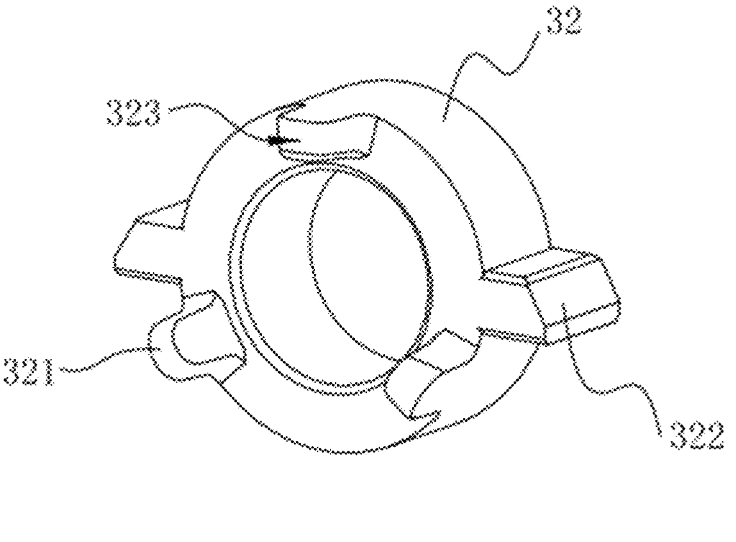
FIG. 7 is a structural schematic diagram of a second clutch piece in a power tool according to implementations of the disclosure.

In the implementation illustrated in FIGS. 6 and 7, a plurality of protrusions 311 are distributed at intervals along an outer peripheral side surface of the first clutch piece 31, a recess 312 being formed between every two neighboring protrusions 311, a convex tooth 321 being formed at a side of the second clutch piece 32 proximal to the first clutch piece 31 and extending towards the first clutch piece 31; when the control pusher 33 is located at the lock-shafting position, the convex tooth 321 is inserted into the corresponding recess 312 so that the first clutch piece 31 and the second clutch piece 32 form a circumferential limit to lock the output shaft 21; insertion of the convex tooth 321 into the recess 312 can improve fitting stability between the first clutch piece 31 and the second clutch piece 32 and reduce a possibility of slip causing relative movement between the first clutch piece 31 and the second clutch piece 32, so that the output shaft 21 is locked more securely and reliably, facilitating replacement of the operating head 24.

It is noted that, in this implementation, the protrusions 311 and the first clutch piece 31 are formed as a unitary structure; of course, it may be understood that, in an alternative implementation, the recesses 312 may be formed as depressions on the outer peripheral side of the first clutch piece 31 or as depressions on a side of the first clutch piece 31 facing the second clutch piece 32; in addition and alternatively, the recesses 312 may be formed on the second clutch piece 32, in which case the convex tooth 321 may be arranged on the first clutch piece 31.

In this implementation, to achieve smoother fitting between the convex tooth 321 and the corresponding recess 312, a first guide surface 313 is provided at an end portion of each protrusion 311 proximal to the second clutch piece 32, and a second guide surface 323 is provided at an end portion of the convex tooth 321 proximal to the first clutch piece 31; the first guide surface 313 and the second guide surface 323 can both guide insertion of the convex tooth 321 into the corresponding recess 312, resulting in smoother fitting between the convex tooth 321 and the recess 312 and reducing a possibility of the convex tooth 321 abutting against the end portion of the protrusion 311, whereby the convex tooth 321 can be stably inserted into the recess 312; of course, it may be understood that, in other implementations, only the first guide surface 313 is provided at the end portion of each protrusion 311, or only the second guide surface 323 is provided at the end portion of the convex tooth 321.

Figure 5:
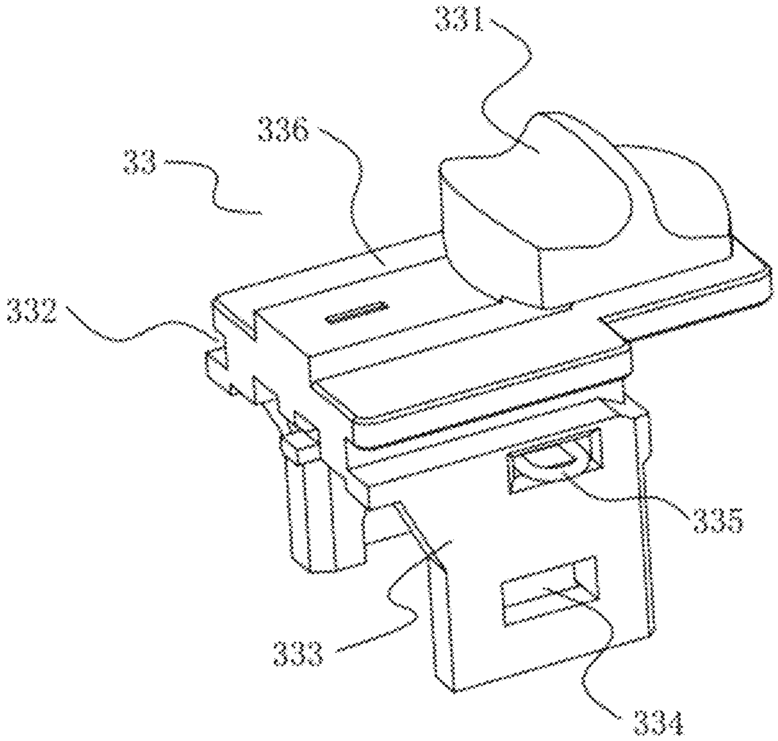
FIG. 5 is a structural schematic diagram of a control pusher in a power tool according to implementations of the disclosure.

As illustrated in FIG. 5, in this implementation, the control pusher 33 comprises a mounting base 336, a push plate 331, and an extension plate 333, on the housing 1 being formed a mounting groove 11 for mounting the control pusher 33, a guide rail 12 for guiding the control pusher 33 to slide being arranged on each of left and right sides of the mounting groove 11, respectively, a sliding groove 332 in sliding connection with the guide rail 12 being formed at each of left and right sides of the mounting base 336, respectively, the guide rail 12 being embedded in the sliding groove 332 so that the control pusher 33 is slidingly mounted in the mounting groove 11; the push plate 331 is secured to an upper end of the mounting base 336 and exposed out of an outer surface of the housing 1; by arranging the push plate 331 to be exposed out of the outer surface of the housing 1, the user can impose a force against the control pusher 33 more conveniently, and fitting between the guide rail 12 and the sliding groove 332 enables the control pusher 33 to slide more smoothly.

In this implementation, the control pusher 33 is provided with two extension plates 333 which extend till two lateral sides of the second clutch piece 32, respectively; a snap slot 334 is formed on each of the extension plates 333, a tab 322 is provided at an outer peripheral side of the second clutch piece 32; the snap-fitting between the tab 322 and the snap slot 334 results in coupling between the control pusher 33 and the second clutch piece 32, which can improve coupling stability between the control pusher 33 and the second clutch piece 32 and reduce a possibility of the second clutch piece 32 disengaging from the control pusher 33, so that the second clutch piece 32 can move synchronously with the control pusher 33; in addition, the second clutch piece 32 is connected to the control pusher 33 via the tabs 322 at two lateral sides, so that the second clutch piece 32 is located in place more stably, reducing a possibility of circumferential rotation of the second clutch piece 32.

Figure 3:
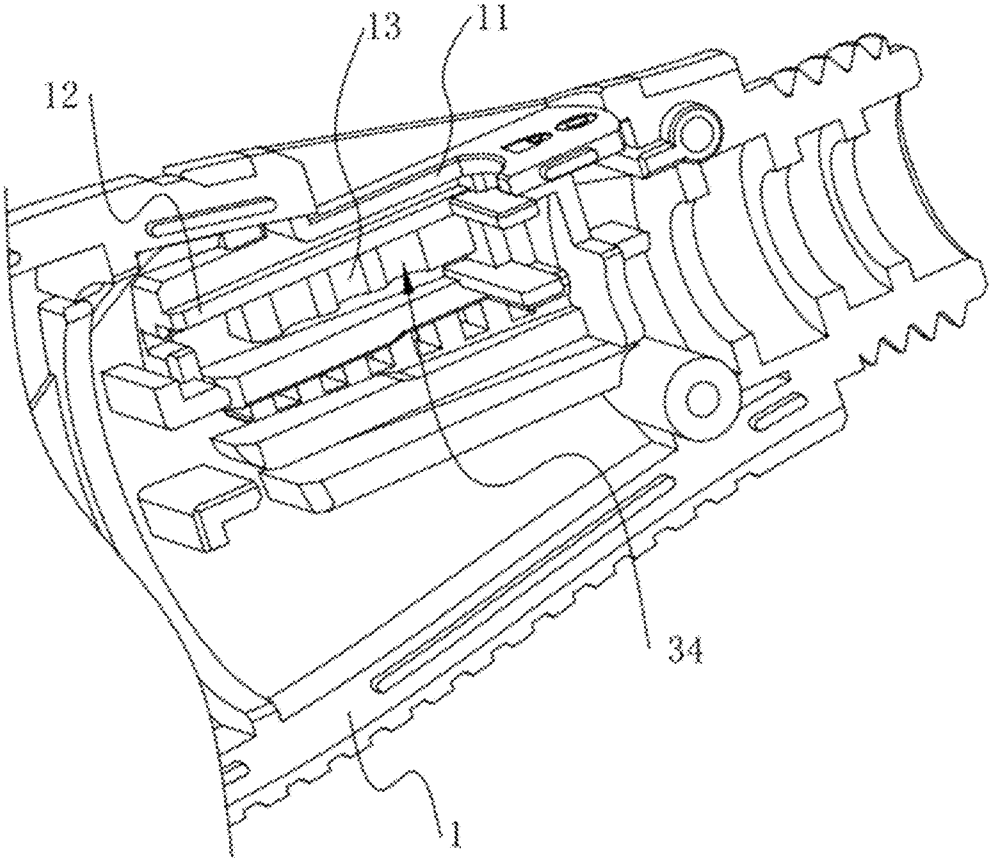
FIG. 3 is an internal schematic diagram of a housing of a power tool according to implementations of the disclosure.

As illustrated in FIGS. 3 and 5, in this implementation, the locating mechanism 34 comprises three locating slots 13 formed in the housing 1 and a locating block 335 disposed on the control pusher 33, the three locating slots 13 corresponding to the power-on position, the power-off position, and the shaft-locking position, respectively; the locating block 335 is an elastomer; two ends of the locating block 335 protrude beyond left and right sides of the control pusher 33, respectively; when the control pusher 33 is located at the power-on position, or the power-off position, or the shaft-locking position, the locating block 335 is inserted in the corresponding locating slot 13; fitting between the locating slot 13 and the locating block 335 enables the control pusher 33 to be firmly retained to the power-on position, or the power-off position, or the shaft-locking position, eliminating a need for the user to press the control pusher 33 all along during the operation, thereby facilitating the user's operation and enhance user experience; in addition, both hands are available to replace the operating head 24 due to elimination of the need of pressing the control pusher 33 all along, which facilitates replacement of the operating head 24 and thus improves replacement efficiency; moreover, by inserting the locating block 335 in the locating slot 13, the user can clearly detect that the control pusher 33 has moved in place, which may improve locating accuracy of the control pusher 33, so that the user can be assured in operating the power tool, further enhancing user experience.

To ease movement of the control pusher 33, in this implementation, both ends of the locating block 335 are formed with a smooth curved surface; the smooth curved surface can reduce the external force needed to release the locating block 335 from the locating slot 13, further reducing the external force needed for the user to push the control pusher 33, thereby easing the user's operation; in addition, this can also lower the possibility of the locating block 335 being stuck in the locating slot 13, rendering smoother sliding of the control pusher 33.

Figure 4:
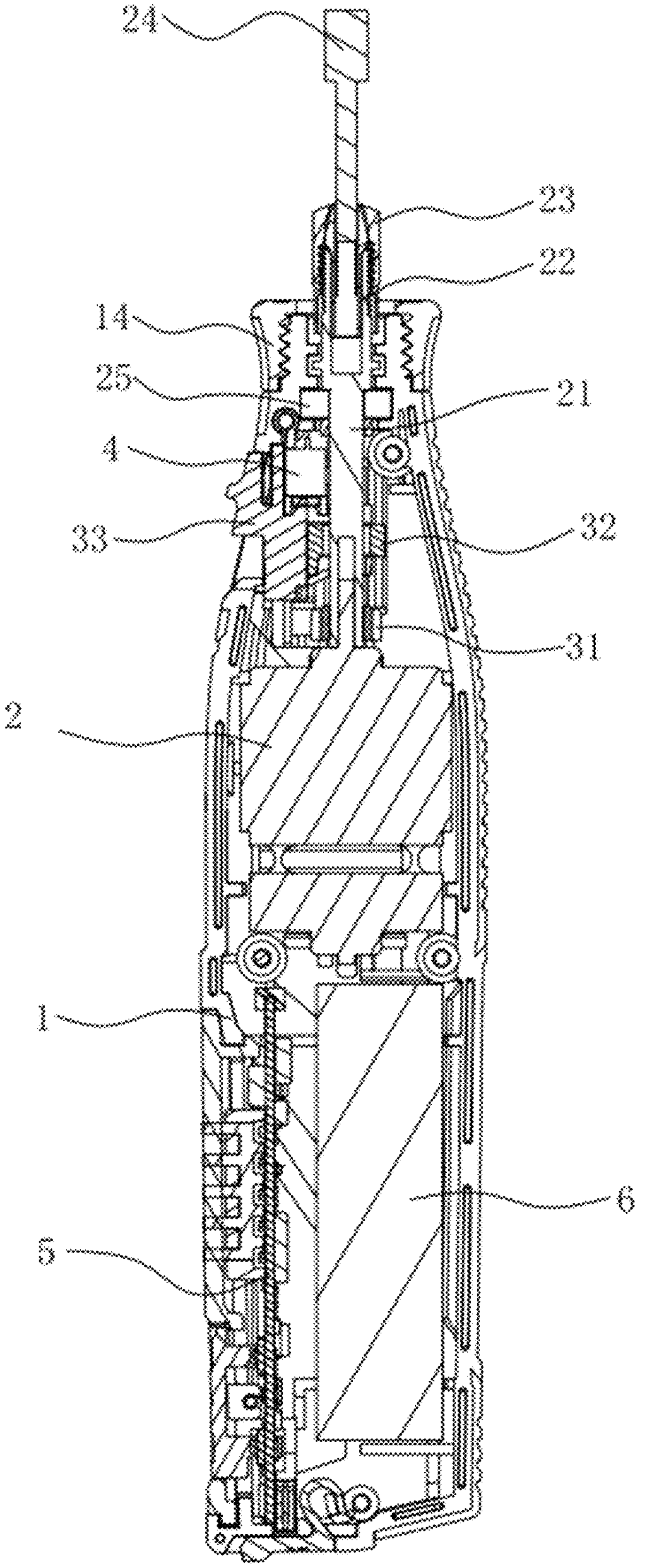
FIG. 4 is a sectional view of a power tool according to implementations of the disclosure.
Figure 8:
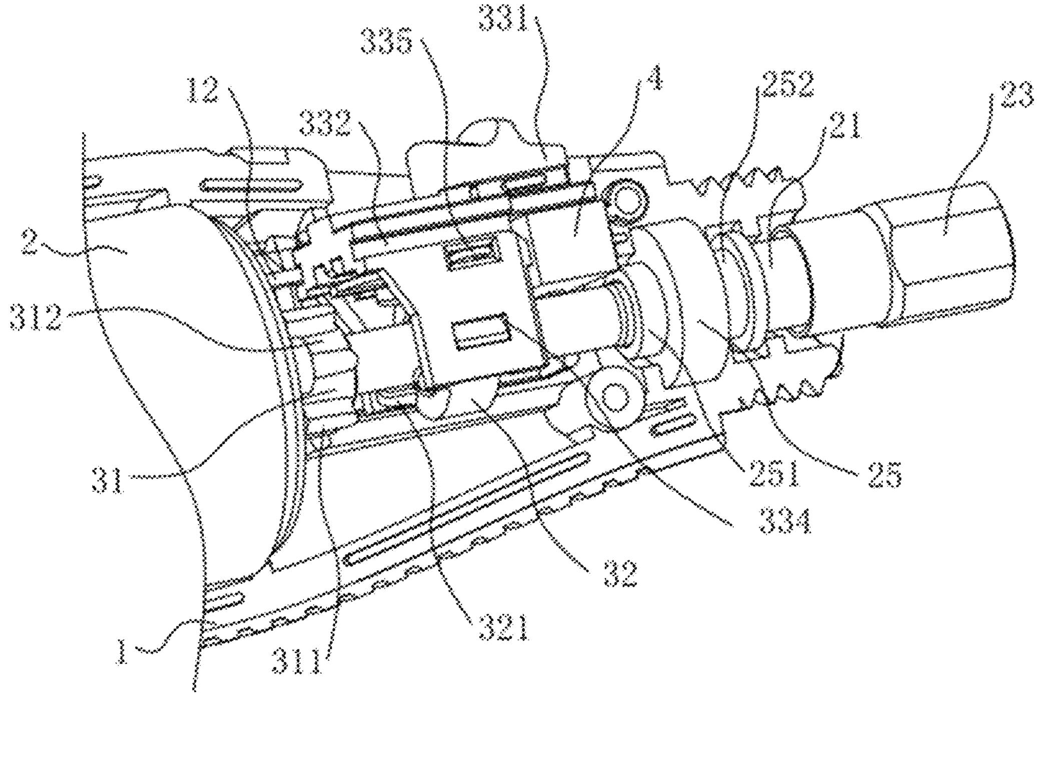
FIG. 8 is a structural schematic diagram of the control pusher located at a power-on position in a power tool according to implementations of the disclosure.

As illustrated in FIG. 1 and FIG. 4, in this implementation, inside the housing 1 are provided a control switch 4, a control circuit board 5, and a power source 6, the power source 6 being configured to energize the power tool, the control switch 4 being connected to the control circuit board 5 via a circuit to control activation and deactivation of the drive motor 2, the control switch 4 being disposed at a front end of the control pusher 33, a contact piece 41 being provided at a side of the control switch 4 facing the control pusher 33; as illustrated in FIG. 8, when the control pusher 33 is located at the power-on position, an abutting surface of the front end of each of the extension plates 333 abuts against the contact piece 41 to trigger the control switch 4, so that the drive motor 2 is activated to drive the output shaft 21 to rotate, whereby the power tool enters an activated state; now, the second clutch piece 32 is driven by the control pusher 33 to move away from the first clutch piece 31.

Figure 9:
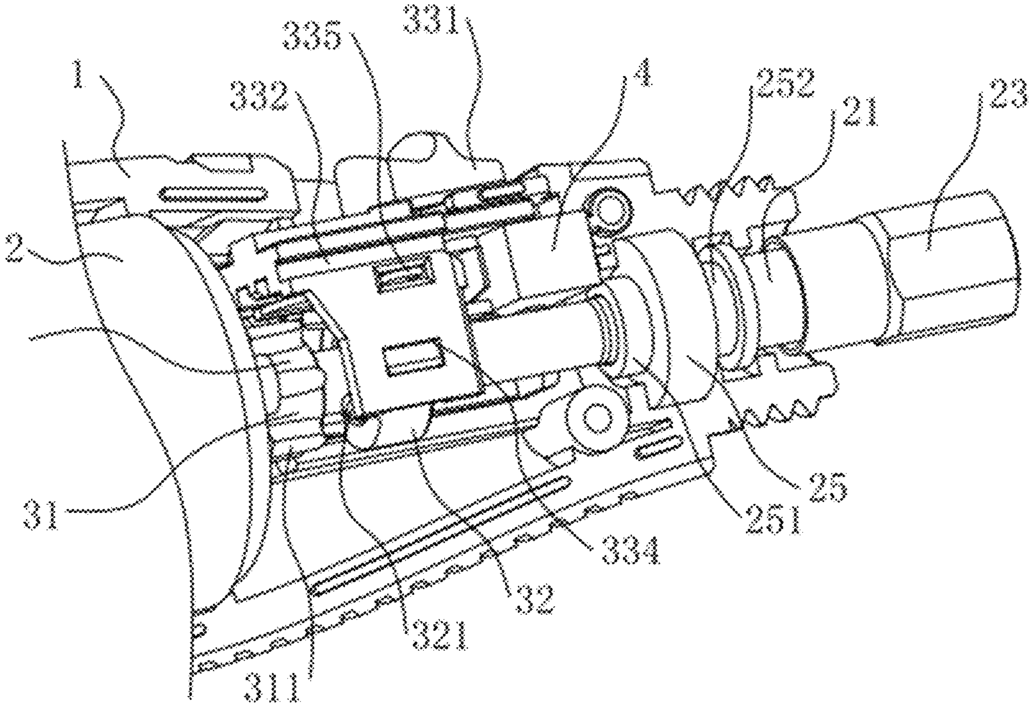
FIG. 9 is a structural schematic diagram of the control pusher located at a power-off position in a power tool according to implementations of the disclosure.

As illustrated in FIG. 9, when the control pusher 33 travels from the power-on position to the power-off position, the control pusher 33 moves away from the control switch 4, and the contact piece 41 is automatically resumed, whereby the control switch 4 cuts off the power source 6 to deactivate the drive motor 2 and meanwhile transmits a power-off signal to the control circuit board 5; the control circuit board 5 applies a counter electromotive force within a very short time to control the drive motor 2 to brake reversely, driving the output shaft 21 to fast stop rotating, thereby lowering a possibility of occurrence of chattering and impact to the first clutch piece 31 and the second clutch piece 32, which can also reduce the user's time in waiting for the output shaft 21 to stop rotation, thereby improving the user's efficiency in replacing the operating head 24.

Figure 10:
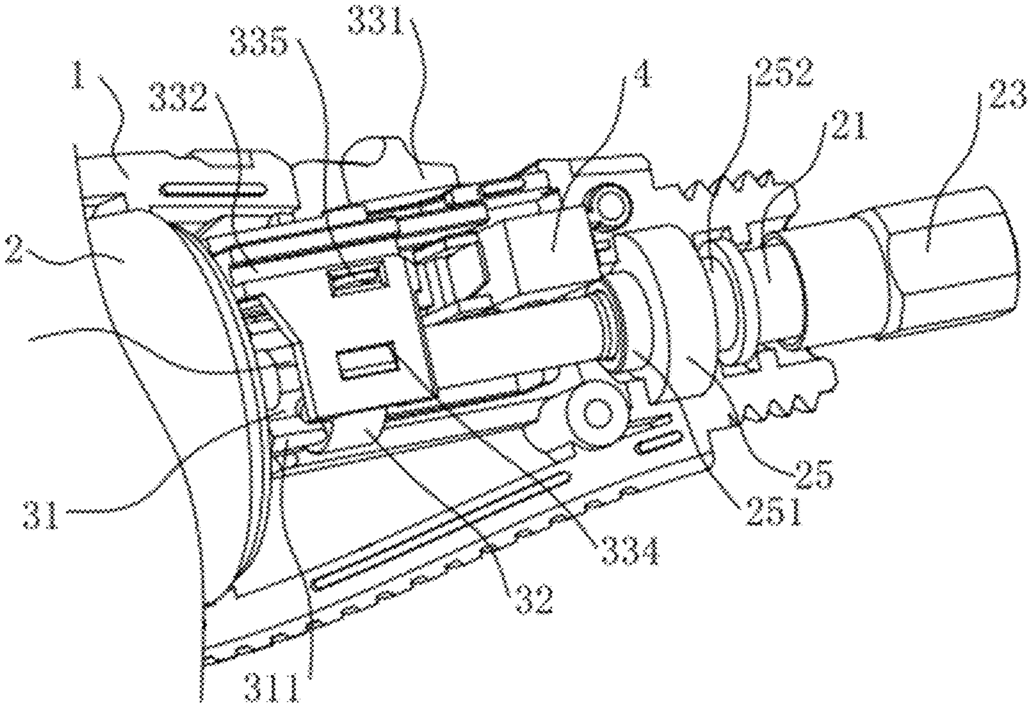
FIG. 10 is a structural schematic diagram of the control pusher located at a shaft-locking position in a power tool according to implementations of the disclosure.

As illustrated in FIG. 10, when the control pusher 33 travels from the power-off position to the shaft-locking position, the control pusher 33 drives the second clutch piece 32 to approach the first clutch piece 31, whereby the convex tooth 321 is inserted into the recess 312 to fit with the latter to form a circumferential limit, further limiting the output shaft 21 from rotating; now, when the locking nut 23 is turned, the output shaft 21 does not turn with the locking nut 23, allowing the locking nut 23 to adjust the clamping force of the clamping core 23 with respect to the operating head 24, which facilitates disassembly and assembly of the operating head 24 to complete replacement of the operating head 24.

The implementations described above are only exemplary implementations of the method and apparatus for controlling operation of the brushless winch motor according to the disclosure, not intended for limiting the scope of the disclosure. The scope of the disclosure is not limited to the exemplary implementations. Any equivalent changes based on the shape and configuration of the disclosure will fall within the scope of protection of the disclosure.

I claim:

1. A power tool comprising:
- a housing;
- a drive motor disposed in the housing;
- a control switch configured to control activation and deactivation of the drive motor the control switch being in the housing;
- an output shaft configured to mount an operating head; and
- a shaft-locking mechanism mounted on the output shaft; wherein:
- the drive motor is in transmission connection with the output shaft,
- the shaft-locking mechanism comprises:
  - a first clutch piece secured to the output shaft,
  - a second clutch piece sleeved over the output shaft, and
  - a control pusher configured to move along an axial direction of the output shaft,
- the control pusher is in transmission connection with the second clutch piece to control the second clutch piece to move along the axial direction of the output shaft,
- the control pusher has
  - a power-on position where the control switch is triggered and the second clutch piece is separated from the first clutch piece,
  - a power-off position where the control switch is released and the second clutch piece is separated from the first clutch piece, and
  - a shaft-locking position where the control switch is released and the second clutch piece and the first clutch piece form a circumferential limit,
- the power-on position, the power-off position, and the shaft-locking position are sequentially arranged along the axial direction of the output shaft,
- a locating mechanism configured to locate the control pusher is disposed between the control pusher and the housing, wherein the locating mechanism comprises three locating slots formed in the housing and a locating block arranged on the control pusher, the three locating slots corresponding to the power on position, the power-off position, and the shaft-locking position, respectively, and
- when the control pusher is located at the power-on position, or the power-off position, or the shaft-locking position, the locating block is inserted into the corresponding locating slot.

2. The power tool according to claim 1, wherein:
- a plurality of recesses are arranged at intervals on a surface of one of the first clutch piece and the second clutch piece,
- a convex tooth is arranged on a surface of another one of the first clutch piece and the second clutch piece, and
- when the control pusher is located at the shaft-locking position, the convex tooth is inserted into a corresponding recess among the plurality of recesses so that the circumferential limit is formed between the first clutch piece and the second clutch piece.

3. The power tool according to claim 2, wherein:
a plurality of protrusions are arranged at intervals on an outer peripheral side surface of the first clutch piece,
a recess is formed between every neighboring two protrusions, and
the convex tooth is arranged at a side of the second clutch piece proximal to the first clutch piece and extends towards the first clutch piece.

4. The power tool according to claim 3, wherein;
a first guide surface is formed at an end portion of each of the protrusions proximal to the second clutch piece; and/or
a second guide surface is formed at an end portion of the convex tooth proximal to the first clutch piece.

5. The power tool according to claim 1, wherein:
the locating block is an elastomer;
two ends of the locating block protrude beyond two lateral sides of the control pusher; and
a smooth curved surface is formed at each of the two ends of the locating block.

6. The power tool according to claim 1, wherein:
a tab is arranged at an outer peripheral side of the second clutch piece;
the control pusher is formed with a snap slot; and
the control pusher and the second clutch piece are connected via snap-fitting between the tab and the snap slot.

7. The power tool according to claim 6, wherein:
the control pusher is provided with two extension plates extending till two lateral sides of the second clutch piece,
the snap slot is formed on each of the extension plates,
a front end of each of the extension plates having an abutting surface, and
when the control pusher is located at the power-on position, the abutting surface abuts against a contact piece of the control switch to trigger the control switch.

8. The power tool according to claim 1, wherein:
the housing is provided with a guide rail configured to guide the control pusher to slide,
the control pusher comprises a push plate and a sliding groove,
the push plate is exposed out of an outer surface of the housing, and
the guide rail is in sliding connection with the sliding groove.

9. The power tool according to claim 1, wherein;
an end portion of the output shaft is attached to a locking nut and a clamping core that are configured to mount the operating head;
a thread is formed on an outer surface of the end portion of the output shaft;
the locking nut is in threaded connection with the output shaft; and
a clamping force of the clamping core with respect to the operating head is adjusted via fitting between the locking nut and the output shaft.

10. A power tool, comprising:
a housing;
a drive motor disposed in the housing;
a control switch configured to control activation and deactivation of the drive motor, the control switch being in the housing;
an output shaft configured to mount an operating head; and
a shaft-locking mechanism mounted on the output shaft; wherein:
the drive motor is in transmission connection with the output shaft,
the shaft-locking mechanism comprises:
a first clutch piece secured to the output shaft,
a second clutch piece sleeved over the output shaft, and
a control pusher configured to move along an axial direction of the output shaft,
the control pusher is in transmission connection with the second clutch piece to control the second clutch piece to move along the axial direction of the output shaft,
the control pusher has
a power-on position where the control switch is triggered and the second clutch piece is separated from the first clutch piece,
a power-off position where the control switch is released and the second clutch piece is separated from the first clutch piece, and
a shaft-locking position where the control switch is released and the second clutch piece and the first clutch piece form a circumferential limit,
the power-on position, the power-off position, and the shaft-locking position are sequentially arranged along the axial direction of the output shaft,
a locating mechanism configured to locate the control pusher is disposed between the control pusher and the housing,
a tab is arranged at an outer peripheral side of the second clutch piece, and the control pusher is formed with a snap slot,
the control pusher and the second clutch piece are connected via snap-fitting between the tab and the snap slot,
the control pusher is provided with two extension plates extending till two lateral sides of the second clutch piece, the snap slot being formed on each of the extension plates,
a front end of each of the extension plates has an abutting surface, and
when the control pusher is located at the power-on position, the abutting surface abuts against a contact piece of the control switch to trigger the control switch.

* * * * *